United States Patent [19]

Blytas et al.

[11] 4,348,368

[45] Sep. 7, 1982

[54] METHOD OF REMOVING HYDROGEN SULFIDE FROM GASES

[75] Inventors: George C. Blytas; Zaida Diaz, both of Houston, Tex.

[73] Assignee: Shell Oil Company, Houston, Tex.

[21] Appl. No.: 267,196

[22] Filed: May 26, 1981

[51] Int. Cl.³ .................... B01D 53/34; C01B 17/04
[52] U.S. Cl. .................... 423/226; 423/224; 423/573 G
[58] Field of Search ............ 423/224, 226, 573, 222, 423/575, 578 R

[56] References Cited

U.S. PATENT DOCUMENTS

| | | | |
|---|---|---|---|
| 2,881,047 | 4/1959 | Townsend | 423/222 |
| 3,068,065 | 12/1962 | Hartley et al. | 423/228 |
| 3,580,950 | 5/1971 | Bersworth | 562/565 |
| 3,933,993 | 1/1976 | Salemme | 423/226 |
| 4,009,251 | 2/1977 | Meuly | 423/573 |
| 4,091,073 | 5/1978 | Winkler | 423/226 |

*Primary Examiner*—Earl C. Thomas

[57] ABSTRACT

A cyclic process for the removal of hydrogen sulfide, and carbon dioxide, from a variety of gas streams is disclosed. The gas stream containing the sour gases is contacted with an aqueous solution of specific reactant materials, optionally in an absorbent, containing specific dialcohols for reaction rate improvement. The hydrogen sulfide is converted to sulfur, $CO_2$ may be absorbed to produce a purified gas stream, and the reactant material is reduced. The process includes sulfur removal and regeneration of the reactant.

20 Claims, No Drawings

METHOD OF REMOVING HYDROGEN SULFIDE FROM GASES

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior or subsequent to regeneration. Suitable reactant materials include polyvalent metallic ions, such as iron, vanadium, copper, manganese, and nickel, and includes polyvalent metal chelates. Preferred reactants are coordination complexes in which the polyvalent metals form chelates with specified organic acids.

In yet another process, e.g., that disclosed in U.S. Pat. No. 4,091,073, issued May 23, 1978, to Winkler, $CO_2$ present in the gaseous stream is also removed by the use of a suitable selective absorbent.

Because these "cleanup" processes generally represent significant costs to manufacturing operations, any improvements in such processes which increase their efficiency may have great economic importance. For example, any low cost measure which will increase the rates of operation of the processes will result in significant savings. The invention concerned with a process of the type described having increased rates of reaction, both in the $H_2S$ conversion stage, and in the regeneration stage.

SUMMARY OF THE INVENTION

Accordingly, the invention comprises, in one embodiment, a process for the removal of $H_2S$ from a sour gaseous steam comprisng contacting the sour gaseous steam in a contacting zone with an aqueous reactant mixture at a temperature below the melting point of sulfur, the aqueous reactant mixture comprising an effective amount of a reactant selected from the group consisting of polyvalent metal ions, polyvalent metal chelate compounds, and mixtures thereof, and a rate modifier selected from compounds having the formula $HO-C_nH_{2n}OH$, wherein n is a number from 4 through 12, and mixtures thereof. A sweet gas stream is produced, and an aqueous admixture containing sulfur and a reduced reactant is removed from the contact zone. At least a portion of the sulfur crystals may be removed before regenerating the reactant, or at least a portion of the sulfur crystals may be removed after regeneration. Alternately, the sulfur may be recovered, as described in copending application Ser. No. 267,182, entitled Froth Process, by G. Blytas and Z. Diaz, filed even date herewith, which disclosure is incorporated herein by reference. The reduced polyvalent metal ions, chelate, etc. are regenerated by contacting the mixture in a regeneration zone or zones with oxygen gas. As used herein, the term oxygen includes oxygen-containing gases, such as air or air-enriched with oxygen. The oxygen oxidizes the reduced metal ions or the metal of the chelate or chelates to a higher valence state, and the regenerated mixture is returned to the contact zone. The rate modifiers employed herein are effective in increasing the rate of regeneration.

In another embodiment of the invention, a sour gaseous stream containing $H_2S$ and $CO_2$ are contacted with a selective absorbent-aqueous reactant mixture at a temperature below the melting point of sulfur, the reactant mixture and procedure being similar to that described, supra. Broadly, this is accomplished by the use of an absorbent mixture containing a selective absorbent for $CO_2$ (and preferably for $H_2S$, as well), an effective amount of a polyvalent metal, polyvalent metal chelate compound, and mixtures thereof, and the rate modifier described. A purified or "sweet" gaseous stream is produced which meets general industrial and commercial $H_2S$ and $CO_2$ specifications. The $CO_2$ is absorbed and the $H_2S$ is immediately converted to sulfur by the polyvalent metal chelate. In the process, the reactant is reduced, and the sulfur may be treated, as described, supra. The sulfur crystals may be removed prior or subsequent to regeneration of the admixture, and the rates of reaction are increased.

The invention also provides, in this embodiment, for the regeneration of the reactant and the absorbent. Specifically, the loaded absorbent mixture and the reduced polyvalent metal ions, polyvalent metal chelate, or mixtures thereof, are regenerated by contacting the mixture in a regeneration zone or zones with oxygen. The oxygen is preferably supplied as air, or air-enriched with oxygen. If significant quantities of $CO_2$ have been absorbed, the reactant-containing solution is preferably treated, such as by heating or pressure reduction, to remove the bulk of the $CO_2$ before regeneration of the reactant, (either prior or subsequent to sulfur removal). Alternately, or if small quantities of $CO_2$ are absorbed, the $CO_2$ may simply be stripped in the regeneration zone.

As indicated, the regeneration of the reactant is accomplished by the utilization of oxygen, preferably as air. The oxygen will accomplish two functions, the oxidation of the reactant to its higher valence state, and the stripping of any residual $CO_2$ (if originally present) from the absorbent mixture. The oxygen (in whatever form supplied) is supplied in a stoichiometric equivalent or excess with respect to the amount of metal ion or chelate present in the mixture. Preferably, the oxygen is supplied in an amount from about 1.2 to 3 times excess.

The particular type of gaseous stream treated is not critical, as will be evident to those skilled in the art. Streams particularly suited to removal of $H_2S$ and $CO_2$ by the practice of the invention are, as indicated, naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbon streams. The term "hydrocarbon steam(s)", as employed herein, is intended to include streams containing significant quantities of hydrocarbon (both paraffinic and aromatic), it being recognized that such streams containing significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. $CO_2$ content may also vary, but preferably will range from about 0.5 percent to about 50.0 percent by volume. Obviously, the amounts of $H_2S$ and $CO_2$ present are not generally a limiting factor in the practice of the invention.

The temperatures employed in the contacting or absorption-contact zone are not generally critical, except that the reaction is carried out below the melting point of sulfur, and, if an absorbent is used, the temperatures employed must permit acceptable absorption of $CO_2$. In many commercial applications, such as the removal of $H_2S$ and $CO_2$ from natural gas to meet pipeline specifications, absorption at ambient temperatures is desired, since the cost of refrigeration would exceed the benefits obtained due to increased absorption at the lower temperature. In general, temperatures from 10° C. to 80° C. are suitable, and temperatures from 20° C. to 45° C. are preferred. Contact times will range from about 1 second to about 120 seconds, with contact times of 2 seconds to 60 seconds being preferred.

Similarly, in the regeneration or stripping zone or zones, temperatures may be varied widely. Preferably, the regeneration zone should be maintained at substantially the same temperature as the contacting zone. If heat is added to assist regeneration, cooling of the aqueous admixture is required before return of the admixture to the contacting zone. In general, temperatures of from about 10° C. to 80° C., preferably 20° C. to 40° C. may be employed.

Pressure conditions in the contacting zone may vary widely, depending on the pressure of the gas to be treated. For example, pressures in the contacting zone may vary from one atmosphere up to one hundred fifty or even two hundred atmospheres. Pressures of from one atmosphere to about one hundred atmospheres are preferred. In the regeneration or desorption zone or zones, pressures may be varied considerably, and will preferably range from about 0.5 atmosphere to about three of four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251 to Meuly, issued Feb. 22, 1977, incorporated herein by reference. Preferably, if the iron chelate of nitrilotriacetic acid is used, pH in the process of the invention will range from about 6 to about 7.5, and the molar ratio of the nitrilotriacetic acid to the iron is from about 1.2 to 1.4. The process is preferably conducted continuously.

As indicated, the $H_2S$, when contacted, is rapidly converted in the process of the invention by the polyvalent metal ions, polyvalent metal chelate, etc. to elemental sulfur. Since many polyvalent metal compounds and metal chelates have limited solubility in many solvents or absorbents, the polyvalent metal compound or chelates are preferably supplied in admixture with the liquid absorbent and water. The amount of polyvalent metal compound, polyvalent metal chelate, or mixtures thereof, supplied is an effective amount, i.e., an amount sufficient to convert all or substantially all of the $H_2S$ in the gas stream, and will generally be on the order of at least about one mol per mol of $H_2S$. Ratios of from about 1 or 2 mols to about 15 mols of polyvalent metal compound or chelate per mol of $H_2S$ may be used, with ratios from about 2 mols per mol to about 5 mols of polyvalent metal compound or chelate per mol of $H_2S$ being preferred. The manner of preparing the admixture containing an absorbent is a matter of choice. For example, the compound or chelate may be added to the absorbent, and, if necessary, then water added. The amount of water added will normally be just that amount necessary to achieve solution of the polyvalent metal compound or chelate, and can be determined by routine experimentation. Since the polyvalent metal compound or chelate may have a significant solubility in the solvent, and since water is produced by the reaction of the $H_2S$ and the ions or chelate, precise amounts of water to be added cannot be given. In the case of absorbents having a low solubility for the polyvalent metal compound or chelate, approximately 5 percent to 10 percent water by volume, based on the total volume of the absorbent mixture, will generally provide solvency. Preferably, however, the polyvalent ions or chelate are added as an aqueous solution to the liquid absorbent. Where they are supplied as an aqueous solution, the amount of solution supplied may be about 20 percent to about 80 percent by volume of the total absorbent admixture supplied to the absorption zone. A polyvalent metal chelate solution will generally be supplied as an aqueous solution having a concentration of from about 0.1 molar to about 3 molar, and a concentration of about 1.0 molar is preferred.

Any polyvalent metal can be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin. The metals are normally supplied as a salt, oxide, hydroxide, etc.

Preferred reactant materials are coordination complexes in which polyvalent metals form chelates with an acid having the formula

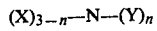

wherein n is a whole number from 1 to 3; Y is an acetic acid or propionic acid group; X is 2-hydroxy ethyl, 2-hydroxy propyl, or an alkyl group having from one to four carbon atoms; or

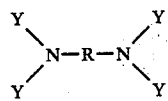

wherein:
from two to four of the groups Y are selected from acetic and propionic acid groups;
from zero to two of the groups Y are selected from 2-hydroxy ethyl, 2-hydroxy propyl, and

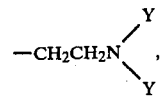

and

R is ethylene, propylene or isopropylene or alternatively cyclohexane or benzene where the two hydrogen atoms replaced by nitrogen are in the 1,2 position, and mixtures thereof.

The polyvalent metal chelates are readily formed in aqueous solution by reaction of an appropriate salt, oxide or hydroxide of the polyvalent metal and the chelating agent in the acid form of an alkali metal or ammonium salt thereof. Exemplary chelating agents include amino acetic acids derived from ammonia or 2-hydroxy alkyl amines, such as glycine, diglycine (imino diacetic acid), NTA (nitrilotriacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylenediamine-N,N-tetraacetic acid, and the amides of polyamino acetic acids disclosed in Bersworth U.S. Pat. No. 3,580,950. NTA and 2-hydroxyethyl ethylene diamine triacetic acid are preferred.

The absorbents employed in this invention are those absorbents which have a high degree of selectivity in absorbing $CO_2$ (and preferably $H_2S$ as well) from the gaseous streams. Any of the known absorbents conventionally used which do not affect the activity of the polyvalent metal ions, polyvalent chelate, or mixtures thereof, and which exhibit sufficient solubility for the reactant or reactants may be employed. As indicated, the absorbent preferably has good absorbency for $H_2S$ as well, in order to assist in the removal of any $H_2S$ present in the gaseous streams. The particular absorbent chosen is a matter of choice, given these qualifications, and selection can be made by routine experimentation. For example, diethylene glycol monoethyl-ether, propylene carbonate, tetraethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art.

As indicated, compounds having the formula HO—$C_nH_{2n}$OH, wherein n is a whole number from 4 through 12, and mixtures thereof, are useful in improving the rate of the conversion reaction and the regeneration reaction. Preferably, the compounds employed are those wherein n is a whole number from 4 through 8. Particularly preferred compounds are 2,3-butanediol, and 1,4-butanediol. The compound or compounds are supplied in an effective amount, i.e., an amount sufficient to improve the rate of reaction. This amount may be determined by experimentation. In general, the amount employed will range from about 0.1 percent to about 10 percent (by weight based on the weight of the solution), with an amount of 0.5 percent to about 1 percent by weight being preferred. Those skilled in the art may adjust the amount added to produce optimum results, a primary consideration being simply the cost of the modifier added.

The manner of recovering the sulfur is a matter of choice. For example, the sulfur may be recovered by settling, filtration, liquid flotation, or by suitable devices, such as a hydroclone.

DETAILED DESCRIPTION OF THE INVENTION

In order to describe the invention in greater detail, the following experiments were run. The values given herein relating to temperatures, pressures, compositions, etc., should be considered merely exemplary and not as delimiting the invention.

EXAMPLE I

Sixty (60) grams of a 2 M aqueous solution of iron n-hydroxyethyl)ethylene diamine triacetate was added to a reaction vessel. The temperature of the liquid was raised to 60° C., and oxygen was sparged through the liquid for ten minutes. Following this procedure, approximately 650 cc of C.P. hydrogen sulfide was added to the reaction vessel and allowed to react until a negative pressure (4 in of Hg) was reached, or 18 minutes and 30 seconds. Oxygen was then added to the vessel in two successive charges of 132 cc each. The time required to react the first charge of oxygen was 5 minutes and 20 seconds; the second charge was fully reacted in 8 minutes and 20 seconds.

EXAMPLE II

In this experiment, a sixty (60) gram charge of a 2 M aqueous solution of iron n-hydroxyethyl ethylene diamine triacetate was added to the reaction vessel, but the solution also contained 0.5 percent by weight, based on the weight of the solution, of 2,3 butanediol. The solution was again oxidized by oxygen sparge for 10 minutes and heated to 60° C. The solution was then reacted with 650 cc of C.P. hydrogen sulfide. The hydrogen sulfide was allowed to react until a negative pressure (4 inches of Hg) was reached, or for approximately 10 minutes and 50 seconds. Oxygen was then added to the vessel in two successive charges of 132 cc, the first reacting out in 1 minute and 55 seconds, the second in 3 minutes and 15 seconds.

EXAMPLE III

Forty eight grams of 1.4 M aqueous solution of iron nitrilotriacetate was added to a reaction vessel. The temperature of the liquid was 25° C., and oxygen was sparged through the liquid for fifteen minutes. Following this procedure, approximately 500 cc of C.P. hydrogen sulfide was added to the reaction vessel and allowed to react until a negative pressure (4 in of Hg) was reached. Oxygen was then added to the vessel to regenerate the charge. The time required to react 244 cc oxygen was 30 minutes.

EXAMPLE IV

In this experiment, a 48 gram charge of 1.4 M aqueous solution of iron nitrilotriacetate was added to the reaction vessel, but the solution also contained 0.5 percent by weight, based on the weight of the solution, of 2,3 butanediol. The solution was again oxidized by oxygen sparge for 15 minutes at 25° C. The solution was then reacted with 500 cc of C.P. hydrogen sulfide. The hydrogen sulfide was allowed to react until a negative pressure (4 inches of Hg) was reached. Oxygen was then added to the vessel to regenerate the charge. The time required to react 247 cc of oxygen was 10 minutes.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, an absorption column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Moreover, because of the tendency of the rate modifiers of the invention toward foaming, the use of antifoam agents, such as alkyl or alkenyl alcohols containing 4 through 18 carbon atoms, may be necessary. Similarly, U.S. Pat. No. 4,009,251 describes various additives, such as sodium oxalate, sodium formate, sodium thiosulfate, and sodium acetate, which may be beneficial.

What is claimed is:

1. A process for the removal of $H_2S$ from a sour gaseous stream comprising:
    (a) contacting the sour gaseous stream in a contacting zone with an aqueous reaction solution at a temperature below the melting point of sulfur, the solution comprising a reactant selected from the group consisting of oxidizing polyvalent metallic ions and oxidizing polyvalent metal chelate compounds, and from about 0.1 percent to about 10 percent by weight, based on the weight of the solution, of a reaction rate modifier selected from compounds having the formula $HO-C_nH_{2n}OH$, wherein n is a number from 4 through 12, and mixtures thereof, and producing a sweet gas stream and an aqueous admixture containing crystalline sulfur and a reduced reactant;
    (b) removing at least a portion of the crystalline sulfur from the aqueous admixture;
    (c) regenerating the aqueous admixture in a regeneration zone with oxygen to produce a regenerated reactant;
    (d) returning aqueous admixture containing regenerated reactant from the regeneration zone to the contacting zone.

2. The method of claim 1 wherein the stream from which the $H_2S$ is removed is selected from naturally occurring gases, synthesis gases, process gases and fuel gas, and wherein n is a whole number from 4 through 8.

3. The method of claim 1 wherein the sour gaseous stream is selected from natural gas, a stream derived from the gasification of coal, or a hydrocarbon stream, and wherein n is a whole number from 4 through 8.

4. A process for the removal of $H_2S$ from a sour gaseous stream comprising:
    (a) contacting the sour gaseous stream in a contacting zone with an aqueous reaction solution at a temperature below the melting point of sulfur, the solution comprising a reactant selected from the group consisting of oxidizing polyvalent metallic ions and oxidizing polyvalent metal chelate compounds, and from about 0.1 percent to about 10 percent by weight, based on the weight of the solution, of a reaction rate modifier selected from compounds having the formula $HO-C_nH_{2n}OH$, wherein n is a number from 4 through 12, and mixtures thereof, and producing a sweet gas stream and an aqueous admixture containing crystalline sulfur and a reduced reactant;
    (b) regenerating the aqueous admixture in a regeneration zone with oxygen to produce a regenerate reactant;
    (c) removing at least a portion of the crystalline sulfur from the aqueous admixture;
    (d) returning aqueous admixture from step (c), and containing regenerated reactant, to the contacting zone.

5. The method of claim 1 wherein the stream from which the $H_2S$ is removed is selected from naturally occurring gases, synthesis gases, process gases and fuel gas, and wherein n is a whole number from 4 through 8.

6. The method of claim 4 wherein the sour gaseous stream is selected from natural gas, a stream derived from the gasification of coal, or a hydrocarbon stream, and wherein n is a whole number from 4 through 8.

7. A process for the removal of $H_2S$ and $CO_2$ from a sour gaseous stream comprising:
    (a) contacting the sour gaseous steam in a contacting zone at a temperature below the melting point of sulfur with a lean $CO_2$-selective liquid absorbent mixture containing an effective amount of a reactant selected from the group consisting of oxidizing polyvalent metallic ions and oxidizing polyvalent metal chelate compounds, and mixtures thereof, and from about 0.1 percent to about 10 percent by weight, based on the weight of the mixture, of a reaction rate modifier selected from compounds having the formula $HO-C_nH_{2n}-OH$, wherein n is a number from 4 through 12, and mixtures thereof, and producing a sweet gaseous stream and an absorbent admixture containing absorbed $CO_2$, crystalline sulfur, and reduced reactant,
    (b) removing at least a portion of the crystalline sulfur from the absorbent admixture, and leaving a solution containing absorbed $CO_2$ and reduced reactant;
    (c) stripping the solution containing absorbed $CO_2$ and said reduced reactant to remove $CO_2$, and then regenerating said solution with oxygen to produce a lean $CO_2$-selective absorbent solution containing regenerated reactant, and
    (d) returning lean $CO_2$-selective absorbent solution containing regenerated reactant to the contacting zone.

8. A process for the removal of $H_2S$ and $CO_2$ from a sour gaseous stream comprising:
    (a) contacting the sour gaseous stream in a contacting zone at a temperature below the melting point of sulfur with a lean $CO_2$-selective liquid absorbent mixture containing an effective amount of a reactant selected from the group consisting of oxidizing polyvalent metallic ions and oxidizing polyvalent metal chelate compounds, and mixtures thereof, and from about 0.1 percent to about 10 percent by weight, based on the weight of the mixture, of a reaction rate modifier selected from compounds having the formula $HO-C_nH_{2n}-OH$, wherein n is a number from 4 through 12, and mixtures thereof, and producing a sweet gaseous stream and an absorbent mixture containing absorbed $CO_2$, crystalline sulfur, and reduced reactant;

(b) stripping the solution containing absorbed $CO_2$, crystalline sulfur, and said reduced reactant to remove $CO_2$, and then regenerating said solution with oxygen, producing a lean $CO_2$-selective absorbent solution containing a regenerated reactant and sulfur, (c) removing sulfur from the lean $CO_2$-selective absorbent solution containing the sulfur and the regenerated reactant, leaving a lean $CO_2$-selective absorbent solution containing regenerated reactant, and (d) returning lean $CO_2$-selective absorbent solution containing regenerated reactant to the contacting zone.

9. The process of claim 3 wherein the reactant is selected from the Fe(III) chelates of nitrilotriacetic acid and 2-hydroxyethyl ethylene diamine triacetic acid.

10. The process of claim 6 wherein the reactant is selected from the Fe(III) chelates of nitrilotriacetic acid and 2-hydroxyethyl ethylene diamine triacetic acid.

11. The method of claim 7 wherein the sour gaseous stream is selected from natural gas, a stream derived from the gasification of coal, or a hydrocarbon stream, and wherein n is a whole number from 4 through 8.

12. The process of claim 11 wherein the reactant is selected from the Fe(III) chelates of nitrilotriacetic acid and 2-hydroxyethyl ethylene diamine triacetic acid.

13. The method of claim 8 wherein the sour gaseous stream is selected from natural gas, a stream derived from the gasification of coal, or a hydrocarbon stream, and wherein n is a whole number from 4 through 8.

14. The process of claim 13 wherein the reactant is selected from the Fe(III) chelates of nitrilotriacetic acid and 2-hydroxyethyl ethylene diamine triacetic acid.

15. A process for the removal of $H_2S$ and $CO_2$ from a sour gaseous stream comprising:

(a) contacting the sour gaseous stream in a contacting zone at a temperature below the melting point of sulfur with a lean $CO_2$-selective liquid absorbent mixture containing an effective amount of a reactant selected from the group consisting of oxidizing polyvalent metallic ions and oxidizing polyvalent metal chelate compounds, and mixtures thereof, and from about 0.1 percent to about 10 percent by weight, based on the weight of the mixture, of a reaction rate modifier selected from compounds having the formula $HO-C_nH_{2n}-OH$, wherein n is a number from 4 through 12, and mixtures thereof, and producing a sweet gaseous stream and an absorbent admixture containing absorbed $CO_2$, crystalline sulfur, and reduced reactant, (b) removing at least a portion of the crystalline sulfur from the absorbent admixture, and leaving a solution containing absorbed $CO_2$ and reduced reactant;

(c) stripping the solution containing absorbed $CO_2$ and said reduced reactant to remove $CO_2$ and regenerating said solution with oxygen to produce a lean $CO_2$-selective absorbent solution containing regenerated reactant, and (d) returning lean $CO_2$-selective absorbent solution containing regenerated reactant to the contacting zone.

16. The method of claim 15 wherein the sour gaseous stream is selected from natural gas, a stream derived from the gasification of coal, or a hydrocarbon stream, and wherein n is a whole number from 4 through 8.

17. The process of claim 16 wherein the reactant is selected from the Fe(III) chelates of nitrilotriacetic acid and 2-hydroxyethyl ethylene diamine triacetic acid.

18. A process for the removal of $H_2S$ and $CO_2$ from a sour gaseous stream comprising:

(a) contacting the sour gaseous stream in a contacting zone at a temperature below the melting point of sulfur with a lean $CO_2$-selective liquid absorbent mixture containing an effective amount of a reactant selected from the group consisting of oxidizing polyvalent metallic ions and oxidizing polyvalent metal chelate compounds, and mixtures thereof, and from about 0.1 percent to about 10 percent by weight, based on the weight of the mixture, of a reaction rate modifier selected from compounds having the formula $HO-C_nH_{2n}-OH$, wherein n is a number from 4 through 12, and mixtures thereof, and producing a sweet gaseous stream and an absorbent mixture containing absorbed $CO_2$, crystalline sulfur, and reduced reactant;

(b) stripping the solution containing absorbed $CO_2$, crystalline sulfur, and said reduced reactant and regenerating said solution with oxygen, producing a lean $CO_2$-selective absorbent solution containing a regenerated reactant and sulfur, (c) removing sulfur from the lean $CO_2$-selective absorbent solution containing the sulfur and the regenerated reactant, leaving a lean $CO_2$-selective absorbent solution containing regenerated reactant, and (d) returning lean $CO_2$-selective absorbent solution containing regenerated reactant to the contacting zone.

19. The method of claim 18 wherein the sour gaseous stream is selected from natural gas, a stream derived from the gasification of coal, or a hydrocarbon stream, and wherein n is a whole number from 4 through 8.

20. The process of claim 19 wherein the reactant is selected from the Fe(III) chelates of nitrilotriacetic acid and 2-hydroxyethyl ethylene diamine triacetic acid.

* * * * *